INVENTOR.
PAUL S. MENOUGH
BY Pyle & Fisher
ATTORNEYS

April 25, 1961   P. S. MENOUGH   2,981,529
SEGMENTAL SEPARATORS FOR HEAT TREATING FURNACES
Filed Nov. 4, 1958   3 Sheets-Sheet 2

INVENTOR.
PAUL S. MENOUGH
BY Pyle & Fisher
ATTORNEYS

April 25, 1961 P. S. MENOUGH 2,981,529
SEGMENTAL SEPARATORS FOR HEAT TREATING FURNACES
Filed Nov. 4, 1958 3 Sheets-Sheet 3

INVENTOR.
PAUL S. MENOUGH
BY Pyle & Fisher
ATTORNEYS

United States Patent Office 2,981,529
Patented Apr. 25, 1961

2,981,529
SEGMENTAL SEPARATORS FOR HEAT TREATING FURNACES

Paul S. Menough, Berea, Ohio, assignor to Patricia M. Vonderau

Filed Nov. 4, 1958, Ser. No. 771,889

3 Claims. (Cl. 263—47)

This invention relates to separator construction intended to serve both as a separator and as a gas directing channel between ladings within an annealing furnace.

Stacking of metal, particularly coils of sheet metal, one over another in a vertical furnace is now accepted practice. The furnaces have been developed to supply and distribute a flow of blown heating gas around the stacked lading to accomplish a uniform heating in the least time. Since these furnaces are well known, and since this invention does not affect the furnace or its usual operation, no furnace is shown. Reference is made to U.S. Letters Patent Straub 2,607,577 and Dailey, Jr., 2,489,012, for teachings of suitable annealing furnaces. Here it will be seen that hot or cold gases are circulated through the aligned core openings of the coils. The gas passes between the coils by passing through the curved veins of the separator. Thus, heat is transferred from the coil edge surfaces as well as the broad flat surfaces. The design of the separator is intended to aid in the uniform heating and cooling of the coil mass.

Early efforts to separate coils in such a furnace may be seen in the radial rib device shown by Brown 1,870,551. Although other separator devices have been developed, it is believed that the evolution of this art, up to the time of this invention, may be summarized by reference to the Straub and Dailey, Jr., patents referred to above. Curved ribs are now considered standard practice to give uniform passageways for both the heating and cooling cycles. The radial spacer bars of Brown allowed a slowing of gas velocity which was proven to be undesirable, whereas the curved rib structure as shown by Dailey gives uniform gas transmission passageways. The curved rib structure is shown in the Mechanical Engineering Handbook, Fourth edition, 1941.

The development of such separators has now transcended the mere provision of a spacer device. Those associated with the manufacture of steel sheets are under continuing pressure to produce a more uniform product. The uniform application of heating and cooling gases in the annealing furnace is one of the approaches to better products.

Further, especially when coiled stock is annealed, the expansion and contraction of the lading over separator bars has induced undesirable coil edge welding, referred to in the trade as "stickers." At annealing temperatures, if a heavy coil edge area is allowed to drag slowly over a projection to produce a high unit of pressure contact, edge welding can, and often does, take place. Such welding destroys much of a sheet coil by causing great chunks to tear away when the coil is opened.

Hence, one primary object of this invention is to provide a separator device having a plate section superposed in stacked relationship and spaced to define a gas transmission area between the plate sections in order to present smooth support surfaces for the lading, and presents a minimum of resistance to the expansion and contraction of the coil limitations as they expand and contract during heating and cooling.

A further object of this invention is to present hot gases directly to the coil edges of coil lading when treating coils, and hence produce a considerably increased heat transfer agency over that obtainable by application of gases only to the surface areas of the lading.

A further object of utmost importance is to stagger the gas outlets from the separator in a manner to tap the gases from one area within the separator to contact the lading above the separator and from another area to contact the lading below the separator.

Another object of this invention is to provide the plate sections as a composite of separate sections arranged in a geometric pattern outline suitable for the intended annealing furnace; the separate sections spaced apart from one another to allow controlled direct gas contact with the lading.

Another object of the invention is to provide the plate sections in a disc geometric pattern with the spaces between the sections radiating outwardly and increasing in size from the central area to the periphery, to thereby admit more gas to the heaviest section of the coil lading.

A still further object of the invention is to provide the spaces of the top pattern staggered with respect to the bottom pattern in order to accomplish the purpose of tapping gases from separate areas within the separator.

A further object of this invention is to provide an improved method of making a separator device of superior strength and maximum flexibility.

A still further object of this invention is to provide a method of more economical use of plate material in the construction of separator devices.

Other objects and a fuller understanding of the invention may be had by referring to the following description and claims, taken in conjunction with the accompanying drawings, in which:

Figure 1:
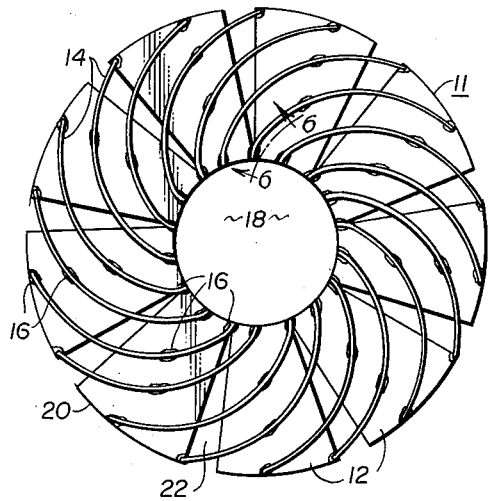
Figure 1 is a first half member of separate plate sections and associated rib members.

To illustrate the improved invention and the preferred method for constructing this embodiment, the drawings have been devised to set forth the manufacturing and assembly steps. In order to understand the construction methods, it is best first to refer to the illustration of the finished product in Figure 3. In this illustration it will be seen that the separator, which is indicated generally by the reference character 10, is composed of two separate supporting planes with a series of ribs between the supporting planes to provide a gas transmission area therebetween and to hold the supporting planes in superposed stacked relationship.

Figure 2:
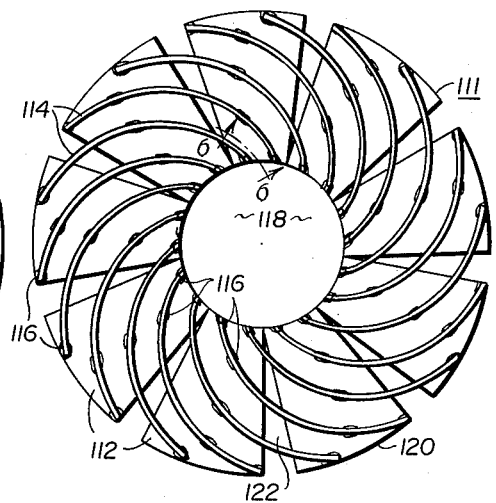
Figure 2 is a substantially mirror image duplicate of Figure 1 to provide a second half member.
Figure 3:
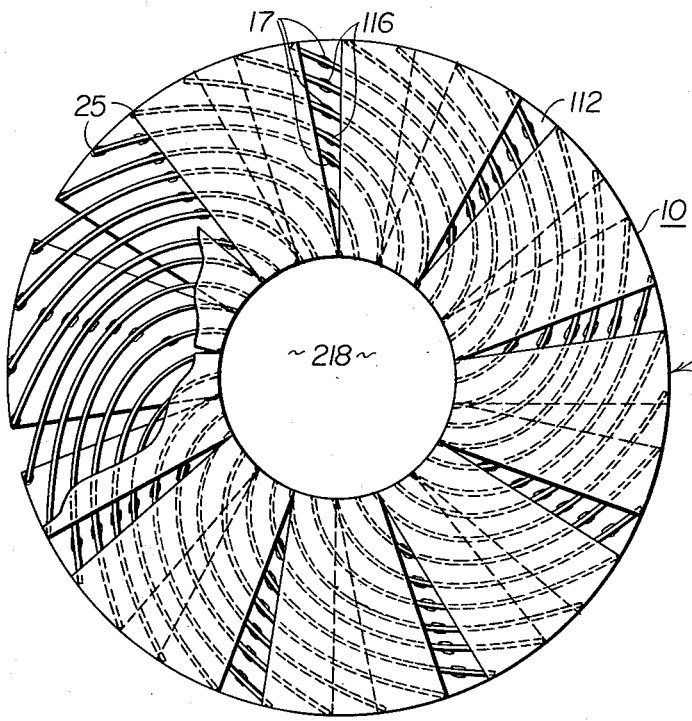
Figure 3 illustrates a separator tray, composed of the half members of Figures 1 and 2 closed together and welded.

The finished separator of Figure 3 is composed of two half members as shown in Figures 1 and 2. The half members of Figures 1 and 2 are substantially identical mirror images of one another and hence like parts of Figures 1 and 2 are referred to by reference characters one hundred numbers apart. Hence, in Figure 1 the half member unit is referred to by reference character 11 whereas the half unit member of Figure 2 is referred to as 111.

By the construction method of the present invention, the supporting planes are composed of separate plate sections 12 in Figure 1 and 112 in Figure 2. The plate sections are joined into a cooperative series arranged in a predetermined geometric pattern and joined together by a series of curved ribs 14 or 114, in Figure 1 or Figure 2. Thereafter, the two half members are joined into the finished unit as illustrated in Figure 3 by superposing one unit upon the other with ribs 14 spaced equidistant between the ribs 114.

Figure 4:
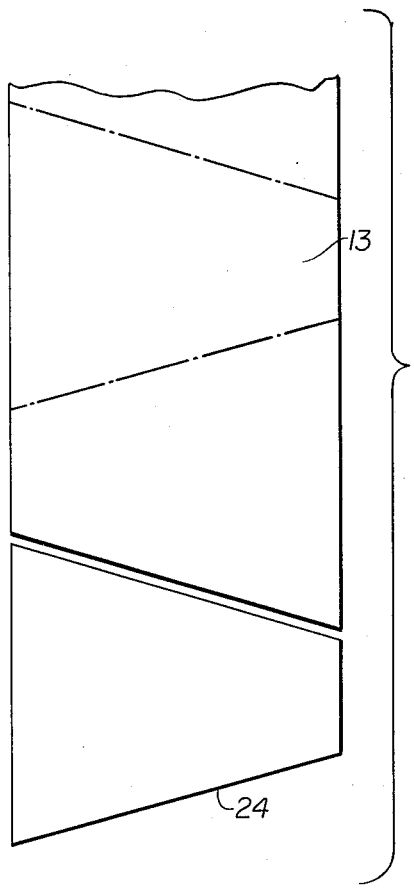
Figure 4 illustrates a possible lay-out of plate sections on a strip of plate steel for economical use of material.
Figure 5:
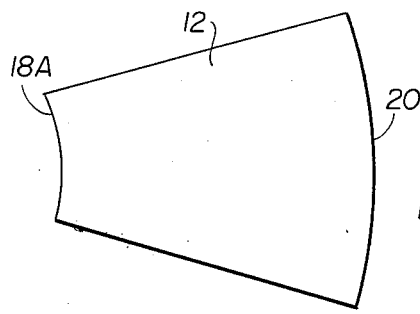
Figure 5 illustrates the completion of curved ends on a section cut as shown in Figure 4.

In the manufacture of this improved separator the novel construction begins with a material saving step illustrated in Figure 4. Figure 4 illustrates a continuous strip 13 substantially as available from the rolling mill. This strip 13 is cut into segment sections 12 and 112 by cutting along lines 24 which outline the form of the segments. Thereafter, curved inner segment edge 18A and curved outer segment edge 20A are formed as shown in Figure 5.

Early developments of separators employed full washer-shaped supporting surfaces and hence required a plate like the plate 13 having a width and length as great as the finished diameter of the separator. The concentric circular cuts were made on such plate with the excess material discarded. The wastefulness of such a process is obvious. The sections 12 and 112, cut from strip 13, as illustrated in Figure 4, waste very little material and these sections may then be arranged in the geometric pattern desired to produce the composite geometric pattern. Hence, in the instance of the preferred disc shaped separator, the amount of waste material is reduced to an extraordinary degree. Furthermore, the shape of the sections can be produced from the strip 13 by alternating the position of the sections. This shape provides for expanding segmental space areas 22 and 122 between the segments when the segments are arranged in the position illustrated in Figures 1 through 3. The edges 20 define a circular peripheral form 20, and the edges 18A define a circular central opening 18 or 118. The segments are preferably wedge-shaped, but only to a degree and therefore produce resultant wedge spaces 22 and 122. Other geometric patterns such as squares or rectangles may be created by separator sections with a variety of possible spaced intervals therebetween. Reference to a geometric pattern or geometric outline is intended to refer to the perimeter configuration. Hence, internal vents and holes are not considered as determining the geometric form.

In the construction of the illustrated preferred embodiment, the sections 12 and 112 are arranged on a supporting surface in the geometric pattern desired and the ribs are positioned upon the pattern as illustrated. In the construction of the half member unit 11 of Figure 1, the plate sections 12 are arranged to define a circular geometric pattern and ribs 14 are positioned as illustrated. Thereafter, the ribs are anchored to the surface of sections 12 by short area welds 16. The curved ribs create the uniform gas transmission passageways as previouly discussed, and in this present invention this curved rib construction serves to unite the plurality of separate plate sections into a cooperating unitary plane. Note that the ability to weld the ribs 14 to the plate sections 12 is entirely unencumbered and hence the weld areas 16 may be placed anywhere desired and may be made as long as desired without restriction. In actual practice, the weld areas 16 are generally limited to relatively short sections. This will allow freedom for the rib members to move somewhat under the influences of heating and cooling. Such movability will relieve stresses which otherwise would be developed. The construction described for the member 11 is likewise applicable to the section 111 except that the ribs 114 are placed upon the plate sections 112 in mirror image direction; that is, they curve in the opposite direction. Comparison of Figures 1 and 2 will illustrate this fact.

After the two half-member units 11 and 111 have been welded into operative units, one member is superposed upon the other. In Figure 3 the construction indicates that the member 11 has been reversed and placed upon the member 111. The ribs 14 are positioned midway between the ribs 114 to define the proper size gas transmission passageway between the spaced stacked geometric patterns created between plate section 12 and 112, Merely seating the unit 11 upon the unit 111 would, of course, be unsatisfactory because these members would shift relative to one another. Hence it is necessary to unite the members, and of course, preferably to unite them by welding. According to this invention, whenever the member 11 is placed upon the member 111 the sections 12 are indexed with respect to the sections 112 such that the sections 12 are spaced over the resultant spaces 122 and conversely the sections 112 are spaced over the resultant spaces 22 of the member 11. Therefore after the unit 11 is placed upon the unit 111 access is available through the spaces 22 to place a series of short welds 17 at the junction between the ribs 14 and the plate sections 112. Likewise, after a series of uniting welds 17 has been made, the partially finished separator disc may be reversed and then access is available through the spaces 122 to unite the ribs 114 with the plate sections 12.

As thus described it may be seen that a quite unique construction method has been created which permits a maximum use of material with extraordinary ease of construction. In particular, this method of construction provides a most convenient method of presenting two operative planes of support with curved ribs defining gas passageways therebetween and providing properly related gas escape vents radiating outwardly to produce direct gas contact upon the surface of the supported lading. All this is accomplished without creation of pressure concentration areas which might tend to weld the edge areas of coil lading.

It is believed unnecessary to illustrate and explain in detail the fact that the ends of the ribs 14 and 114 are edge welded to the opposite plate sections at the ends of the ribs after the uniting weld areas 17 have been completed. This extra weldment is illustrated in Figure 3; for example, as indicated by reference character 25.

Lifting may be accomplished in the conventional known manner. The composite of inner edge areas 18A creates a composite central opening 18 or 118. The united half members create central opening 218.

The usual lift device enters the separator opening 218 and sends out radial lifting dogs. These dogs engage suitable catch surfaces provided for that purpose.

Figure 6:
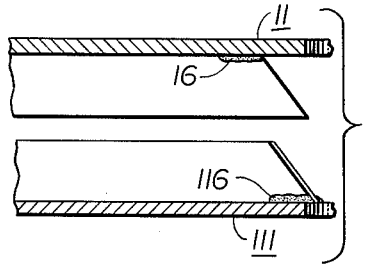
Figure 6 is a section taken along line 6—6 of Figure 1 and a section taken along line 6—6 of Figure 2 superposed as they would appear in the act of being assembled.
Figure 7:
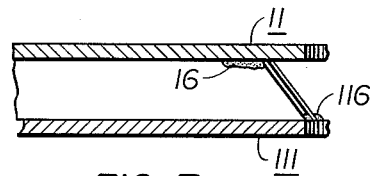
Figure 7 illustrates the same sections closed together, with the ribs of one half member welded thereto, and the ribs of the other half member welded thereto, but the ribs of one half member not yet welded to the other, as prior to completion of the separator unit during construction.
Figure 8:
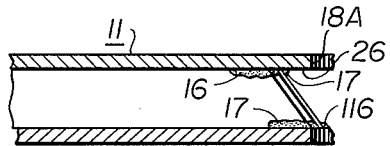
Figure 8 illustrates the completion of the two separate half members into a unit by weld union.

In the series of illustrations Figure 6 through Figure 8, it may be seen that the inner ends of the ribs 14 and 114 are cambered to allow an overhang area 26 for engagement of such lift devices.

Figure 9:
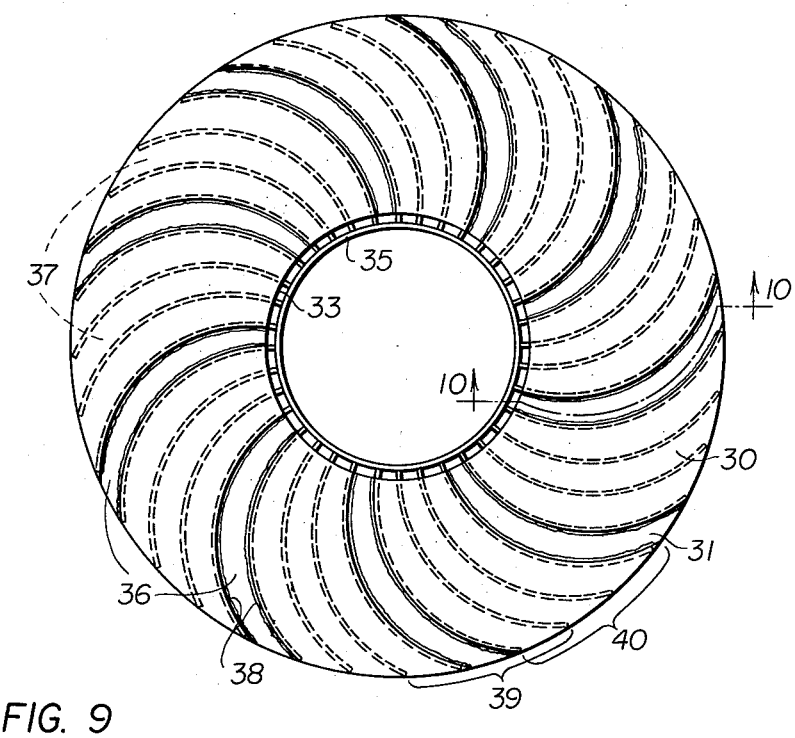
Figure 9 illustrates an alternative construction having certain construction advantages.

Reference to Figure 9 will illustrate an alternate embodiment of the invention having certain advantages which are sometimes useful. According to this embodiment, the plate sections, referred to by the reference character 30, are curved with the side areas corresponding to the curvature of the rib members. Hence, the rib members do not bridge over adjoining plate sections but are confined wholly within the outlines thereof. In Figure 9 the plate sections on the top as viewed in the illustration are referred to by reference character 30 whereas those spaced opposite to sections 30 are referred to by the reference character 31. The sections 30 and 31 are cut from a continuous strip in much the manner illustrated and described in the Figures 4 and 5. The ribs are attached to the plate sections individually or the plate sections may be arranged in the geometric pattern and the ribs thereafter applied. If desired, the sections may be temporarily united into a half member unit for handling purposes prior to completion of the construction. The half members, after being constructed much in the manner illustrated in Figures 1 and 2, are brought into operative relationship by superposing two such half member units. The plate sections 30 are indexed with respect to the plate sections 31, thereby producing spaces 36 on one side, but covered by a plate section on the other side. A construction advantage now becomes apparent. To illustrate the indexed relationship better, brackets 39 are provided to emphasize the span of the curved plate section 31 and the bracket 40 illustrates the span of the plate section 30. It is an overlapped, indexed relationship. Hence, spaces 36 between plate sections 30, enable welding access to unite the rib 32 at the edge of the plate section with the opposite plate section which bridges over the particular space 36. Likewise, spaces 37 created between the plate sections 31 provide welding access to unite the edge rib thereof with the plate section 30 that bridges over the space 36. This operation is substantially identical to the uniting of members 11 and 111 except that full welding access along an entire edge of the side ribs of each section is possible rather than a series of weld areas along a limited space of all of the rib areas.

Figure 10:
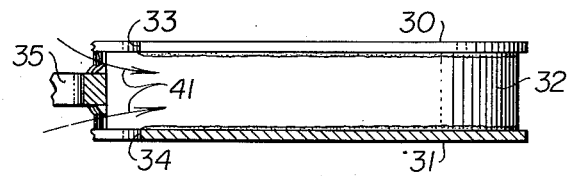
Figure 10 is a section taken along line 10—10 of Figure 9.

The Figure 10 illustrates a lifting construction which may be incorporated into either of the embodiments if desired. It is necessary to pick up the separators. As suggested above, it is now customary to provide a lifting device which will go into the central opening 218 and expand lifting dogs to catch the separator and thereafter lift the separator from this central opening.

In order to provide a catch surface for such lifting, the ribs 32 are extended beyond the inner circle curved edges 33 and 34 of the plates 30 and 32 and a lifting ring 35 is welded around the extended ends of these ribs. Hence, the lifting ring 35 is spaced from the innermost ends of the sections 30 and 31 and does not block off the free flow of gases. The ring 35 is made as narrow as practical in order to aid in this free flow access. The illustration in Figure 10 must be carefully scrutinized in order to avoid confusion. The vertical lines are the ends of other ribs 32 and not solid support members which would stop the flow of gases. To emphasize this freedom of flow, flow arrows 41 have been aded to the Figure 10.

Although the described structures and method will suggest alternate constructions and uses, it should be noted that the bottom separator used in most commercial furnaces need not have two spaced plate areas. Since there is no lading below, there need not be any support plate. Therefore, a fully operative device may be made according to this invention embodying a series of separate plate sections lying in a plane and arranged in a geometric pattern with spaced intervals, and with rib means uniting the separate sections. In this case, the ribs all lie on one side of the section plane and define the gas transmission passageways therebetween.

Although the invention has been described in its preferred form with a certain degree of particularity, it is understood that the present disclosure of the prefered form has been made only by way of example and that numerous changes in the details of construction and the combination and arrangement of parts may be resorted to without departing from the spirit and the scope of the invention as hereinafter claimed.

What is claimed is:

1. A gas circulating separator adapted to be interposed between the individual coils of a vertical pile of coils being annealed, comprising, a first series of separate plate sections lying in radial relationship in a first plane, said plate sections each having an inner edge shaped as a segment of a composite edge defining a central opening, the sections having side edges radiating from said central opening, said side edges positioned closely at said central opening with said inner edges lying along a major portion of said central opening, the side edge of each member cooperating with the adjacent like side edge of the next section to outline a radially extending vent therebetween, said plate sections each having an outer edge shaped as a segment of a composite geometric form, a second series of separate plate sections arranged in a predetermined geometric pattern subtantially similar in size and form to the pattern of the first plane, said vents of the first series indexed with respect to the vents of the second series to radially overlap the side edges of each segment with respect to the edge of a plate section of the opposite series and to position all vents opposed to a plate section of the opposite series, and a plurality of outwardly extending rib members secured between the sections of the first and second series holding said first and second planes in an operative unit superposed in stacked relationship and spaced to define a gas transmission area therebetween, said rib members each extending substantially from the said central opening to said composite outer edge.

2. In the separator of claim 1, said ribs being distributed in a uniform pattern and each vent being bridged by a plurality of ribs.

3. A gas circulating separator adapted to be interposed between the individual coils of a vertical pile of coils being annealed, comprising a first series of separate plate sections lying in radial relationship in a first plane, said plate sections each having an inner edge shaped as a segment of a composite edge defining a central opening, the sections having side edges radiating from said central opening, said side edges positioned closely at said central opening with said inner edges lying along a major portion of said central opening, the side edge of each member cooperating with the adjacent like side edge of the next section to outline a radially extending vent therebetween, said plate sections each having an outer edge shaped as a segment of a composite geometric form, a second series of separate plate sections arranged in a predetermined geometric pattern substantially similar in size and form to the pattern of the first plane, said vents of the first series indexed with respect to the vents of the second series to radially overlap the side edges of each segment with respect to the edge of a plate section of the opposite series and to position all vents opposed to a plate section of the opposite series, each said vent of each series bridged by at least one rib member which rib member is secured to the adjacent plates defining the vent and to the area of the plate section opposed to said vent in the area thereof exposed by said vent, and each said rib member extending substantially from the said central opening to said composite outer edge.

References Cited in the file of this patent

UNITED STATES PATENTS

| | | |
|---|---|---|
| 1,067,428 | Holder et al. | July 15, 1913 |
| 2,003,773 | Gross | June 4, 1935 |
| 2,489,012 | Dailey | Nov. 22, 1949 |
| 2,641,456 | Schmertz | June 9, 1953 |
| 2,671,656 | Winder | Mar. 9, 1954 |
| 2,904,325 | Jones et al. | Sept. 15, 1959 |

FOREIGN PATENTS

| | | |
|---|---|---|
| 957,004 | France | Aug. 15, 1949 |